United States Patent [19]

Karg et al.

[11] Patent Number: 5,104,037
[45] Date of Patent: Apr. 14, 1992

[54] MICROPROCESSOR CONTROLLED CLIMATE CONTROL DEVICE FOR A PLURALITY OF MASS TRANSIT VEHICLES

[75] Inventors: Kenneth A. Karg, Belle Vernon; Carl K. Hvozda, Homer City, both of Pa.

[73] Assignee: AEG Westinghouse Transportation Systems, Inc., Pittsburgh, Pa.

[21] Appl. No.: 603,508

[22] Filed: Oct. 26, 1990

[51] Int. Cl.$^5$ ............................................. F23N 5/20
[52] U.S. Cl. ................................. 236/46 R; 236/51; 237/12.3 R
[58] Field of Search ................. 165/12; 236/51, 46 R; 237/13, 12.3 R

[56] References Cited

U.S. PATENT DOCUMENTS 3,877,639  4/1975  Wilson et al. .................. 236/51 X
4,860,950  8/1989  Reeser et al. ..................... 236/51

Primary Examiner—William E. Wayner
Attorney, Agent, or Firm—Spencer & Frank

[57] ABSTRACT

A heating, ventilation and air conditioning (HVAC) system and method for a plurality of mass transit vehicles where each vehicle has at least one independently actuated HVAC unit comprises a command center remote from the plurality of mass transit vehicles, for individually controlling the HVAC unit of each of the plurality of mass transit vehicles. The command center control unit includes a memory unit for storing temperature values desired for each vehicle, and corresponding times of a day and days on which the stored temperature values are desired within each respective vehicle. A sensing device is disposed within each of a plurality of mass transit vehicles. A comparator device, disposed in communication with the plurality of sensing devices and the command center, compares sensed existing temperature levels with stored temperature values for respective ones of the mass transit vehicles and generates control signals being a function of a difference between the sensed temperature and the stored temperature value of a respective vehicle. An operating device, responsive to the generated control signals operates the respective HVAC units of the respective vehicles to reduce the difference between the sensed existing temperature and the stored desired temperature of each respective vehicle.

14 Claims, 5 Drawing Sheets

MICROPROCESSOR CONTROLLED CLIMATE CONTROL DEVICE FOR A PLURALITY OF MASS TRANSIT VEHICLES

BACKGROUND OF THE INVENTION

The invention relates to a heating, ventilation and air conditioning system for a plurality of mass transit vehicles wherein a single microprocessor climate control device is used to automatically heat, air condition and/or ventilate each mass transit vehicle depending upon the desired interior air temperature set within each respective transit vehicle.

The invention also concerns a method of controlling the respective heating, ventilation and air conditioning units of a plurality of mass transit vehicles.

In mass transit vehicles there is a need for more varied control of the inside temperature of a vehicle. This is especially true for light rail passenger service, such as subways, as well as heavy rail (e.g., AMTRAK train service). Presently available heating, ventilation and air conditioning (HVAC) systems for light rail vehicles employ controls that are initially set manually and then operate automatically to regulate the interior temperature of a vehicle to a preset comfort level or range. Moreover, these known climate control devices only provide a limited number of comfort levels and must be adjusted manually, for example by a human operator turning valves, at each vehicle to vary the desired comfort level within each respective mass transit vehicle. U.S. Pat. No. 2,675,998 to Reynolds discloses such an "automatic" climate control device for railway cars.

A climate control device for the passenger compartment of a motor vehicle is described in U.S. Pat. No. 4,289,195 to Bellot et al. This climate control device includes a microcalculator, connected to electronic probes for measuring the temperature inside and outside the passenger compartment, and means for selecting and correcting various modes of operation at a passenger's demand. U.S. Patent No. 4,328,855 to Iwata et al. also relates to an electric control system for an automobile air conditioner, i.e., a climate control system for a single moving vehicle. Neither Bellot et al., nor Iwata et al. describes or discloses a device which can control the interior climate of a plurality of moving vehicles.

A wide variety of climate control devices are known for a multiple room structure or building. These HVAC systems employ a central processor which monitors the ambient air temperature of each room and controls the operation of each room's heating and cooling device to achieve the desired ambient air temperature programmed for each room. Known environmental control systems of this type include those described in U.S. Pat. Nos. 4,284,126 to Dawson and 4,174,064 to Pratt, Jr.

A programmable thermostat which features a memory unit receptive of unit values of temperature desired at different times on different days and a microcomputer with clock for the control unit is described in U.S. Pat. Nos. 4,267,966 to Neel et al. and 4,300,199 to Yoknis et al. While the temperature control unit and programmable thermostats taught by Neel et al. and Yoknis et al. allow for preprogrammed automatic changing of temperature levels based on entered unit values, these devices are for use in a building or other stationary space. Thus, it is known to control individual room temperatures and humidity within a building or a single moving vehicle. In these systems designed for buildings, the individual HVAC units are hard wired to their respective control unit and thus, these programmed climate systems are not appropriate for a climate control device for a plurality of mass transit vehicles.

Despite the availability of microprocessor controlled buildings, known HVAC systems for mass transit vehicles are battery powered, manually actuated and controlled by employing complicated and hazardous manual operations. Since mass transit vehicles may be driverless (i.e., trains operated via microprocessor controlled programs) and thus, no operator is on board to adjust the desired comfort level of a vehicle's passenger compartment, each HVAC system is individually set to a desired comfort level for the day before being placed in service. However, if the day's temperature differs from the expected temperature for the day (e.g., the forecast was for a sunny day, temperature in the 90's but, an unexpected cold front lowered the outside temperature), the vehicle's HVAC unit cannot be easily adjusted to adapt to current weather conditions and continues to operate the HVAC unit in the mode (e.g., air conditioning) set that morning.

Even if the vehicles are driven by operators, it is still necessary to pull a vehicle out of service to make the appropriate changes to known HVAC control units as adjustments are usually made outside the vehicle, for example, underneath a railway car using a voltmeter or other manual device. Additionally, only coarse temperature adjustments can be made to control the vehicle temperature and only two or three preset temperature levels are available to choose from in known mass transit climate control devices. Further, operators still must be sent out early to a train yard or vehicle storage area to manually set and turn on a vehicle's HVAC unit before the vehicle is placed into service so that the vehicle's interior is at a comfortable level for its passengers.

Thus, it can be seen that there is a need for a heating, ventilation an air conditioning system which is flexible and simple, and remotely controls a plurality of mass transit vehicles' individual HVAC units. In addition, such an HVAC system should permit very small increments of temperature change and provide smooth automatic climate control all year round without the need for manual adjustments, other than the selection of a desired comfort level from inside the vehicle.

SUMMARY OF THE INVENTION

The instant invention solves the above problems associated with known mass transit climate control devices by providing a heating, ventilation and air conditioning (HVAC) system which communicates with individual HVAC units of a number of mass transit vehicles to control the interior temperature and humidity of the plurality of mass transit vehicles depending upon the respective desired temperature within each respective vehicle. This HVAC system is powered by electricity an is extremely flexible allowing fine increments of temperature/humidity adjustments, either remotely with automatic preprogrammed changes of temperature levels, or locally within any mass transit vehicle at any time of the day.

According to the invention, the above features are achieved by providing a central command center, in communication with and remote from a plurality of mass transit vehicles, each vehicle having disposed therein at least one independently actuated heating, ventilation and air conditioning unit and sensing means for sensing existing temperatures levels within the respective mass transit vehicle. The control means of the central command center includes memory means for storing temperature values desired for each vehicle and corresponding times of a day and days on which the stored temperature values are desired in each vehicle and is in communication with means for selectively entering the desired temperature values and the corresponding times of the day and days into the memory means for each of the plurality of mass transit vehicles. Comparator means are disposed in communication with the sensing means of each mass transit vehicle and the control means of the central command center for comparing sensed existing temperature levels with respective stored temperature values for respective mass transit vehicles and generating a respective control signal for each respective mass transit vehicle where each respective control signal is a function of the difference between the sensed temperature and the desired stored temperature value of a respective vehicle. Operating means, responsive to the control signals generated by the comparator means, are provided for operating the heating, ventilation and air conditioning units of the respective vehicles to reduce the difference between the sensed existing temperature and the stored desired temperature of each respective vehicle.

In another aspect of the invention, the control means may include means for transmitting a command signal representing the stored temperature values, and a comparator means can be disposed on each vehicle which comprises first receiving means for receiving a command signal from the remote control means indicating the desired temperature of the respective mass transit vehicle and the times of day at which the temperature is desired, storage means for storing the command signal, second receiving means for receiving the sensed existing temperature value of the respective vehicle and means coupled to the first and second receiving means for comparing the sensed and desired temperatures of the respective vehicle and generating the control signals.

The flexible decision-making process for controlling the above-described system includes the steps of storing temperature values desired for each of the plurality of mass transit vehicles at a remote central control station; sensing the existing temperature within each of the plurality of mass transit vehicles; comparing the sensed existing temperature of each of the plurality of vehicles with the corresponding stored temperature value desired for the respective vehicle; generating a respective control signal for each of the plurality of vehicles indicating a difference between the sensed temperature and the stored temperature value of each respective vehicle; and automatically activating the respective heating, ventilation and air conditioning units of each vehicle in response to the generated control signals to effect reduction of the difference between the sensed and the stored desired temperatures for each vehicle.

One advantage of the above-described method and system is the efficiency and flexibility of the programmable, climate controlled system. With the present invention manpower savings can be realized, as well as energy savings, since the central command center can automatically turn on, off or maintain comfortable levels within a vehicle at any time of a day. Thus, with the above-described system and method, it is no longer necessary to send technicians or other personnel out to vehicles in a storage yard to turn on/off their HVAC units, and the interior temperature/humidity of passenger compartments in a plurality of mass transit vehicles can be set remotely to a more economical level while in a wait mode or remotely adjusted while the car is in service to a more comfortable temperature level.

Another embodiment of the HVAC system of the present invention includes override means in communication with the remote control means of the central command center and additional means for selectively entering temperature unit values disposed in each of the plurality of mass transit vehicles. With these features, an operator of a respective mass transit vehicle can manually override the temperature values stored in the central command center for that vehicle and enter different temperature unit values based on the current weather and/or interior climate within the vehicle. The specially input temperature and humidity values are automatically maintained by the central command center until changed by new values input by a vehicle operator, or the remote program of the command center is reinitiated.

BRIEF DESCRIPTION OF THE DRAWINGS

Other features and advantages of the present invention will become apparent to those skilled in the art upon reading the following description of a preferred embodiment thereof with reference to the drawings in which.

DETAILED DESCRIPTION OF THE PREFERRED EMBODIMENTS

Figure 1:
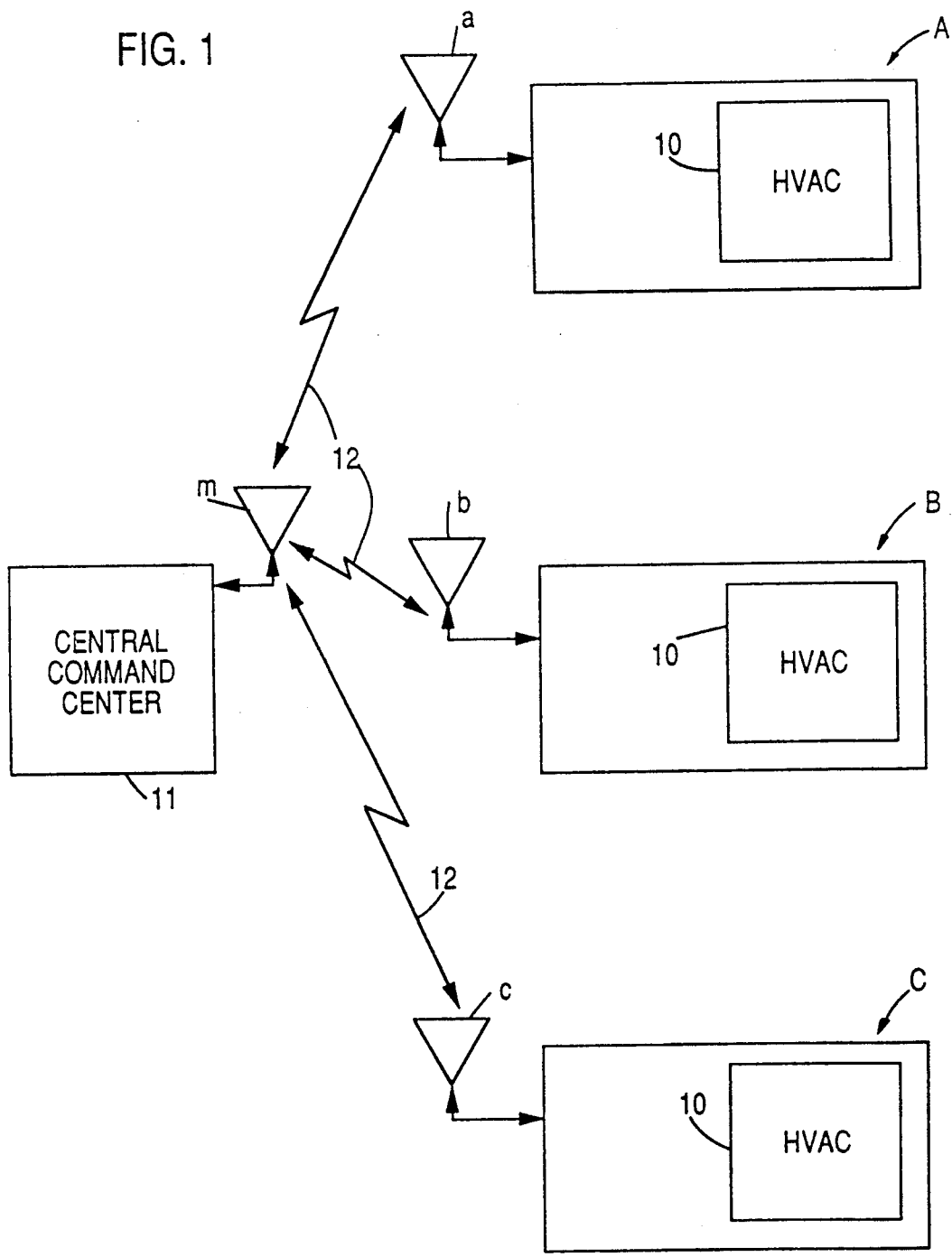
FIG. 1 is a schematic illustration of a control system, according to the present invention, for a plurality a mass transit vehicles.

Referring to FIG. 1, there is illustrated a schematic block diagram of a plurality of mass transit vehicles A,B,C having antennas a,b,c in wireless communication with a central command center 11. According to the present invention, each mass transit vehicle includes an independently actuated heating, ventilation and air-conditioning unit 10 and has its own antenna which can receive signals from and transmit signals to antenna m of central command center 11 as indicated by lines 12 which represent radiowaves, soundwaves or another conventional wireless communication medium.

A block diagram illustrating the components of a single HVAC unit 10 and central command center 11 will now be described with reference to FIG. 2.

A basic HVAC system according to the present invention comprises a central command center 11 including a computer 14; temperature sensing elements 16 exposed to the temperature of the passenger compartment in each of the plurality of mass transit vehicles; a microprocessor 18 including a comparator unit in communication with central command computer 14 and sensing elements 16; and operating control devices, disposed in each vehicle, responsive to control signals generated by microprocessor 18 for operating the appropriate elements of a respective HVAC unit in order to reduce the difference between the existing sensed temperature of a vehicle and the stored desired temperature of the respective vehicle.

Figure 2:
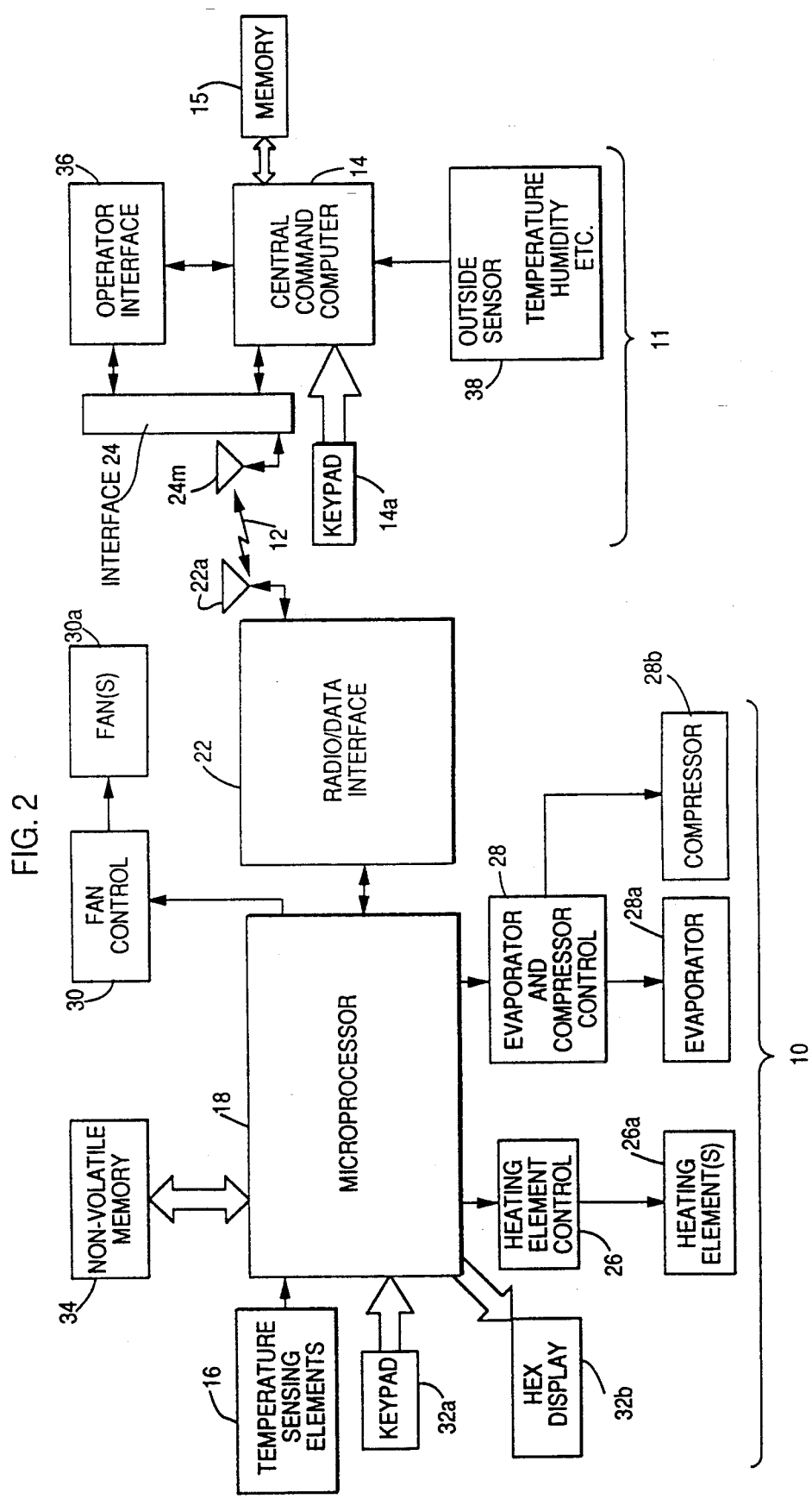
FIG. 2 is a block diagram of a heating, ventilation and air conditioning system according to the present invention.

According to a preferred embodiment of the present invention as shown in FIG. 2, each individual mass transit vehicle has its own microprocessor 18 which may be a single chip microprocessor, such as an EPROM with permanent memory. In this embodiment, microprocessor 18 receives the sensed temperature, humidity or other climate related values from respective sensing elements 16 disposed in its vehicle and the desired stored values for its vehicle from central command computer 14, compares the two values, and generates a control signal based on a comparison of the actual sensed values with the stored temperature or humidity values.

A radio/data interface 22 in communication with microprocessor 18 receives the stored, desired climate information transmitted in the form of command signals via antenna 22a from central command computer 14 of central command center 11. As indicated by line 12 in FIG. 2, antenna 22a is in wireless communication with antenna 24m of central command center 11 which transmits command signals generated by computer 14 and coded for transmission by the appropriate electrical interface 24. The preferred communication medium is radio waves.

After the sensed, existing temperature values and stored unit values are compared, a control signal is generated by microprocessor 18 which is a function of the difference between the sensed temperature and the stored temperature value of respective vehicle. These control signals are received by the appropriate HVAC operating control devices of the vehicle which in turn automatically activate the respective heating and cooling elements of HVAC unit 10.

The HVAC operating control devices of each vehicle may include a heating element control 26 which regulates heating element(s) 26a disposed in the vehicle; an evaporator and compressor control 28 which regulates an evaporator 28a and, a compressor 28b; and a fan control 30 which actuates a fan or fans 30a disposed in the vehicle. The operating control devices and their respective controlled elements 26a, 28a, 28b, 30b are conventional, variable speed operating devices which can accurately heat or cool an area to specific unit temperature levels.

Central command computer 14 may be a conventional computer, such as an INTEL 8088, located remote from the plurality of mass transit vehicles for executing the required digital calculations on the basis of a predetermined control program. Based on these calculations, the central command computer can control the fan speed, and/or heating or cooling elements in the heating, ventilation and air-conditioning unit 10 of each of the plurality of mass transit vehicles. A memory 15 is in communication with central command computer 14 from which stored unit values representing the desired temperature, humidity, etc. levels for each one of the plurality of mass transit vehicles can be accessed via the predetermined control program. This program may be a climate control program developed using conventional programming techniques which addresses variable unit values stored in memory 15. These stored values are indicative of the desired climate in each passenger compartment.

Central command computer 14 is provided with a command keypad 14a for selectively entering the desired temperature unit values and corresponding times of the day and days into memory 15. For example, comfort levels ranging from unit values from 65° F. (18° C.) to 85° F. (29° C.) can be entered into memory 15 via command keypad 14a along with the time of day and day when the entered comfort levels are desired. Thus, memory 15 can store both the desired temperature unit values for each of the mass transit vehicles, and the corresponding times of a day and days on which the stored temperature values are desired.

The variable speed or intensity of heating or cooling is based on the amount of difference between the sensed and store values. For example, if a comfort level requiring a 65° F. temperature is desired and the current interior temperature of a vehicle is sensed at 85° F., the control signal actuates evaporator and compressor control 28 which in turn activates respective elements (28a, 28b) to produce cool air at a temperature of 60° F., and activates fan control 30 to run fan(s) 30a at a high speed.

Another feature the HVAC system according to the present invention allows operators or passengers of a vehicle to control or adjust the interior vehicle temperature. In this embodiment, each mass transit vehicle may be provided with a computer having a keypad 32a so that an operator of a mass transit vehicle, or in the case of driverless vehicles— an announcer of the various stops, may selectively enter temperature unit values or other climate control values to override the programmed values of central command computer 14 and to take the vehicle out of remote automatic control.

The temperature, humidity or other related values input via keypad 32a at the mass transit vehicle are stored in a conventional non-volatile memory 34, such as a RAM, disposed in communication with the single chip processor 18 of each vehicle. This local memory in a mass transit vehicle is able to prevent previously stored, locally entered climate parameters from being lost if the main power of the mass transit vehicle (and thus, the power to memory 34) is shut off. The advantage of this feature is that it is n longer necessary to have a battery operated climate control system.

In addition, each vehicle's computer may be provided with a hex or digital display 32b which displays the current temperature unit value desired for the vehicle. This feature enables an operator to verify the inputted data.

These locally inputted values can be transmitted via antenna 22a for reception by antenna 24m and interface 24 at the central command center. The received signals are translated at a operator interface 36 into a readable format for central command computer 14. These received values then can be entered into memory 15 enabling a central command center operator to know the status of that particular mass transit vehicle. Operator interface 36 generates an override signal indicating that the vehicle operator has transmitted locally, inputted unit value changes and that the programmed stored temperature (humidity or other climate) values are no longer desired. Thus, keypad 32a attached to a vehicle's computer can serve as an override means. Accordingly, an operator can key in a desired temperature, humidity, etc. level or reprogram the remote climate control program, and the heating element control 26, evaporator and compressor control 28 and fan control 30 will automatically respond.

Central command center 11 may further include outside sensors 38 exposed to the temperature, humidity, and other weather conditions in the commuting area of the plurality of mass transit vehicles which their respective HVAC units must take into account to automatically adjust the interior comfort level of each vehicle, despite values stored in the climate program of central command computer 14. The outside climate parameters values read by outside sensors 38 are input into central command computer 14 and are further compared with the current interior temperatures of each of the plurality of mass transit vehicles as described below.

Figure 3:
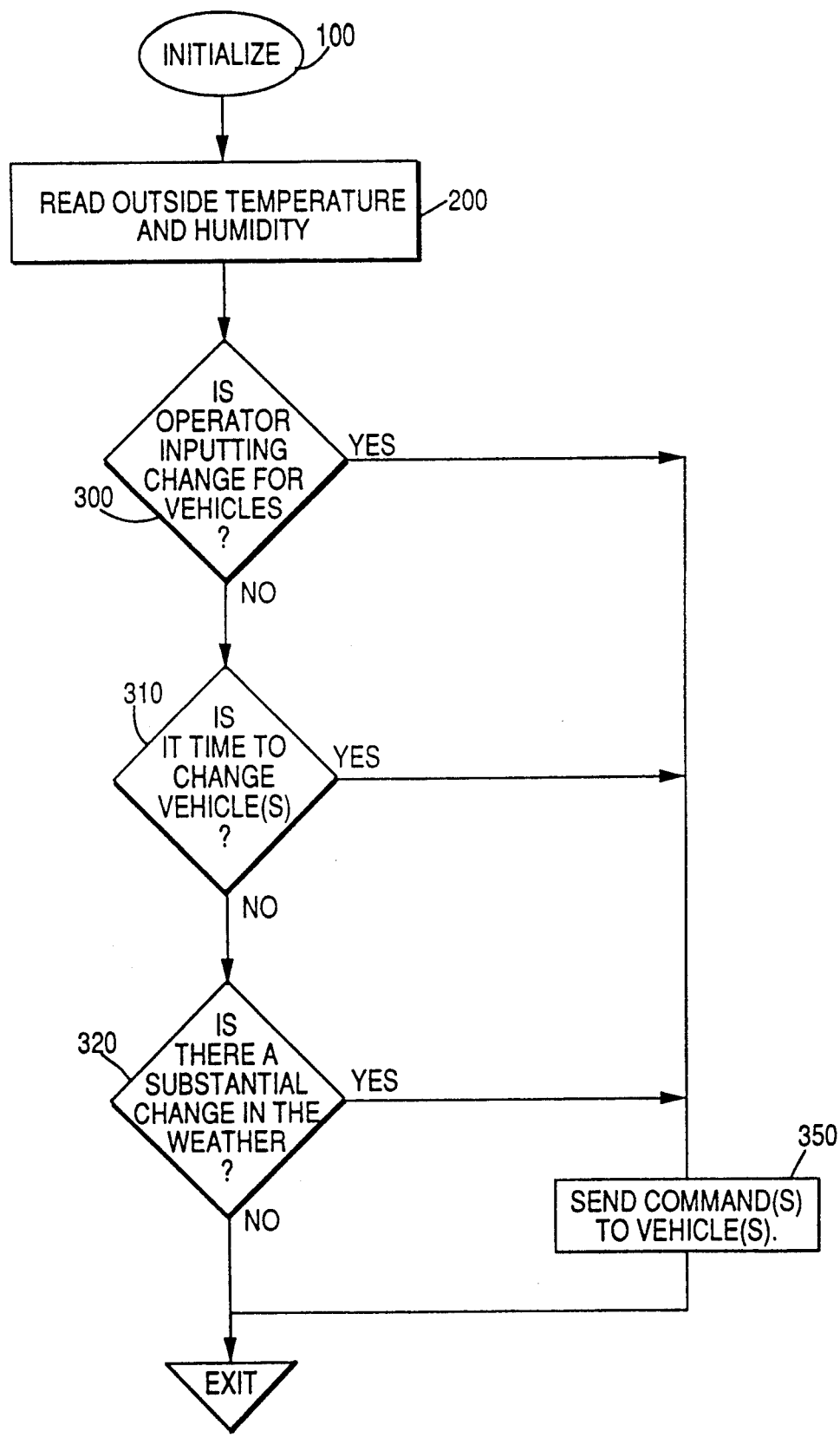
FIG. 3 is a flow chart illustrating how the central command center of the present invention sends commands to vehicles.

Hereinafter, the operational mode of the embodiment shown in FIG. 2 will be described with reference to FIGS. 3, 4A and 4B. The flow chart in FIG. 3 illustrates steps for a command control routine through which it is determined what commands and when such commands are sent to the plurality of mass transit vehicles. As described above, command computer 14 of central command center 11 is provided with a climate control program having a ROM which receives and stores temperature values desired for each of the plurality of mass transit vehicles. A command control routine to be executed by command computer 14 is initialize at step 100 when the power operating the vehicle is turned on. Since the memory, as well as the climate control program, is located at central command center, there is no need for a battery to constantly operate while the main power of the vehicle is off to save the program and stored values. Further, even the embodiment including a non-volatile memory 34 does not require a battery, as the command control center can automatically turn on the vehicle's power when the locally inputted HVAC values are desired.

At step 200, the outside temperature, dew point and humidity level values, as well as other appropriate values can be measured by the outside sensors 38 and entered into central command computer 14. These outside climate values are stored for the following periodic determinations in the command control routine.

First, it is determined if central command computer 14 has received an override signal indicating temperature unit value changes have been input at a vehicle. If this determination is YES, central command center 11 has received a radio wave, soundwave, lightwave or other wireless signal through antenna 24m representing the newly input temperature values and a command signal is output indicating that the temperature value stored in central command computer 14 is no longer desired at step 350 If the determination at step 300 is NO, the program of central command computer 14 is accessed to determine if it is time to change vehicles at step 310. That is, if one of the vehicles is scheduled to come out of service, central command computer 14 may indicate the heating and cooling of its HVAC unit can be slowed down (and ultimately turned off). Or, if another vehicle will be placed on line shortly, its HVAC unit can be turned on to prepare for that day's service.

If the answer at Step 310 is YES, step 350 causes a command to be sent to the respective vehicles representing the control signal which indicates the operating control devices to be activated. If no vehicle temperature changes are programed for that time, step 320 causes a comparison of stored outside temperatures to determine if a substantial change in the weather has occurred. In this step, the current outside climate values are compared with those levels stored at step 200 in the previous control routine. If the change in the outside temperature and humidity is significant (i.e., more than a few degrees), a command is sent at step 350 to mass transit vehicles currently in service to determine if their individual HVAC units need adjustment. If there is NO substantial change in the weather, central command center 11 would exit this program and return to it at another appropriate time, as the program may dictate.

Figure 4A:
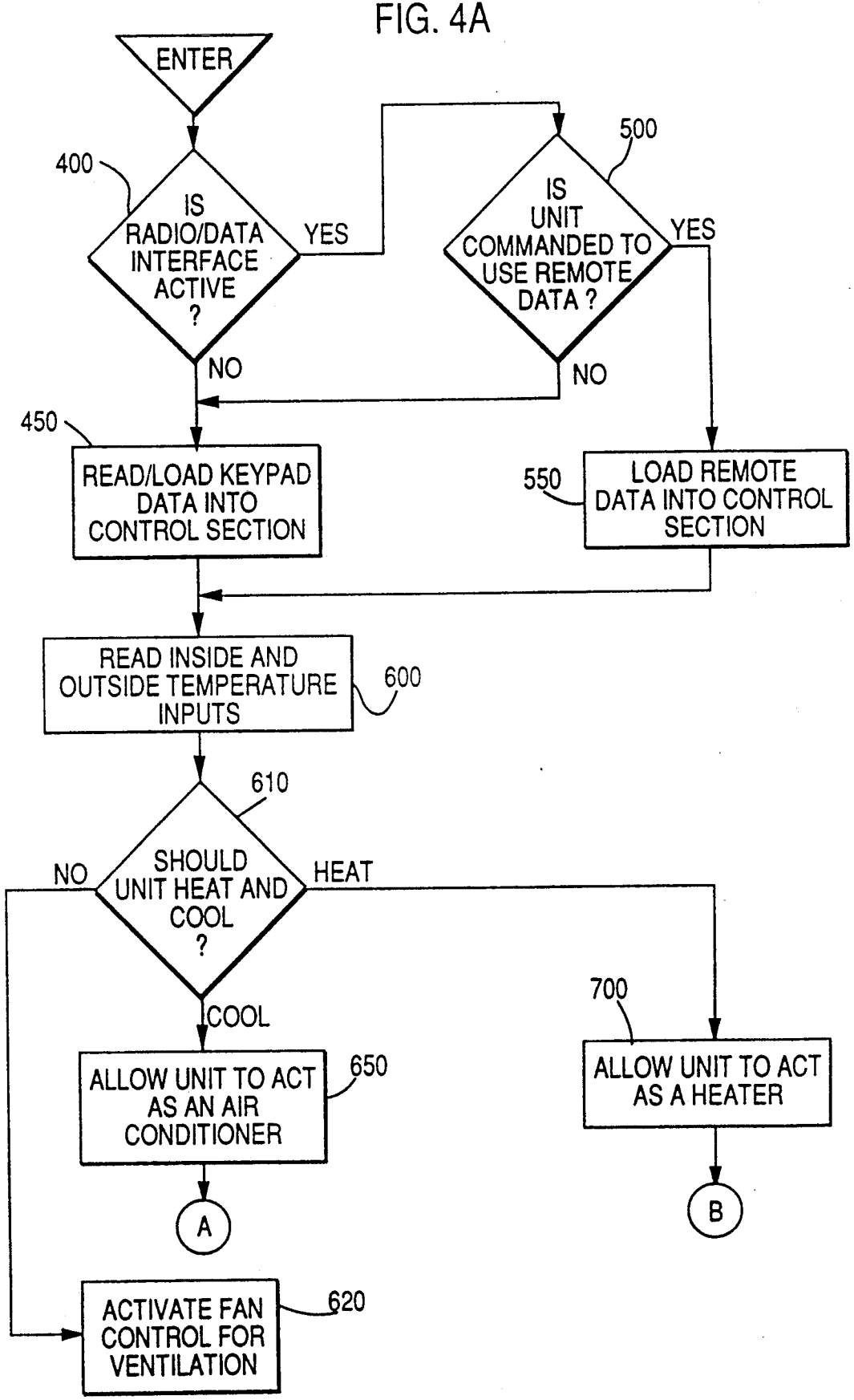
FIGS. 4A and 4B illustrate a flowchart for controlling the heating, ventilation and air conditioning units of a vehicle according to the present invention.

With reference to FIG. 4A the commands and response of each individual HVAC unit will now be described. First, the comparator unit of microprocessor 18 of each vehicle determines if its radio/data interface 22 is active in Step 400. If the radio/data interface is active, it is determined at step 500 if a command signal representing remote stored temperature values and their corresponding times, or, if a command signal indicating that an operator is taking charge of the climate control of his respective vehicle has been transmitted at step 350. If remote data is no longer desired for a particular vehicle or if the radio/data interface is not active, microprocessor 18 of the individual vehicles HVAC unit would receive the keypad data entered at keypad 32a during step 450. If the HVAC unit of a vehicle is commanded to use remote data, then the remote data is loaded into the control section of microprocessor 18 at step 550. Accordingly, the HVAC unit responds to commands issued by remote central command computer 14 of central command center 11.

After either steps 450 and 550, the sensed existing temperature within each of the plurality of mass transit vehicles and the temperature outside the vehicles are respectively read by temperature sensors 16, 38 (step 600). These values are then input to the respective vehicles for comparison with the stored desired values of the respective vehicle (step 610).

Based on comparisons among the current temperature values and stored values, microprocessor 18 can generate a control signal which determines whether the unit should heat or cool. For example, during step 610, both the surrounding outside temperature value and the stored temperature value of each respective vehicle are compared with the interior temperature. First control signals are generated being a function of the respective difference between the sensed temperature and the stored temperature value of each vehicle which control the basic decision of step 610. Second control signals in dependence of the difference between the current outside temperature and the respective sensed interior temperature, as well as the amount of difference indicated by the respective first control signal, determine the intensity and the elements of each respective HVAC unit to be activated as described below.

According to one embodiment of the present invention, determining step 610 includes comparing the surrounding outside temperature with one of three temperature ranqes and selecting one of the three temperature ranges as the operating temperature range based on this comparison. The second control signal can indicate either a first temperature range (e.g., below 60° F.) which would allow heating element control 26 and 26a to act as a heater (step 700), a second range (e.g., above 75° F.) which would allow evaporator 28a and compressor 28b to act as an air conditioner for cooling (step 650), or a third temperature range (e.g., between 60° F. and 75° F.) which would only activate fan control 30 for ventilation (step 620). The advantage of this control system is that HVAC units can run smoothly and efficiently throughout the year, as the system avoids the possibility of shifting between heating and cooling control elements while still providing ventilation.

Figure 4B:
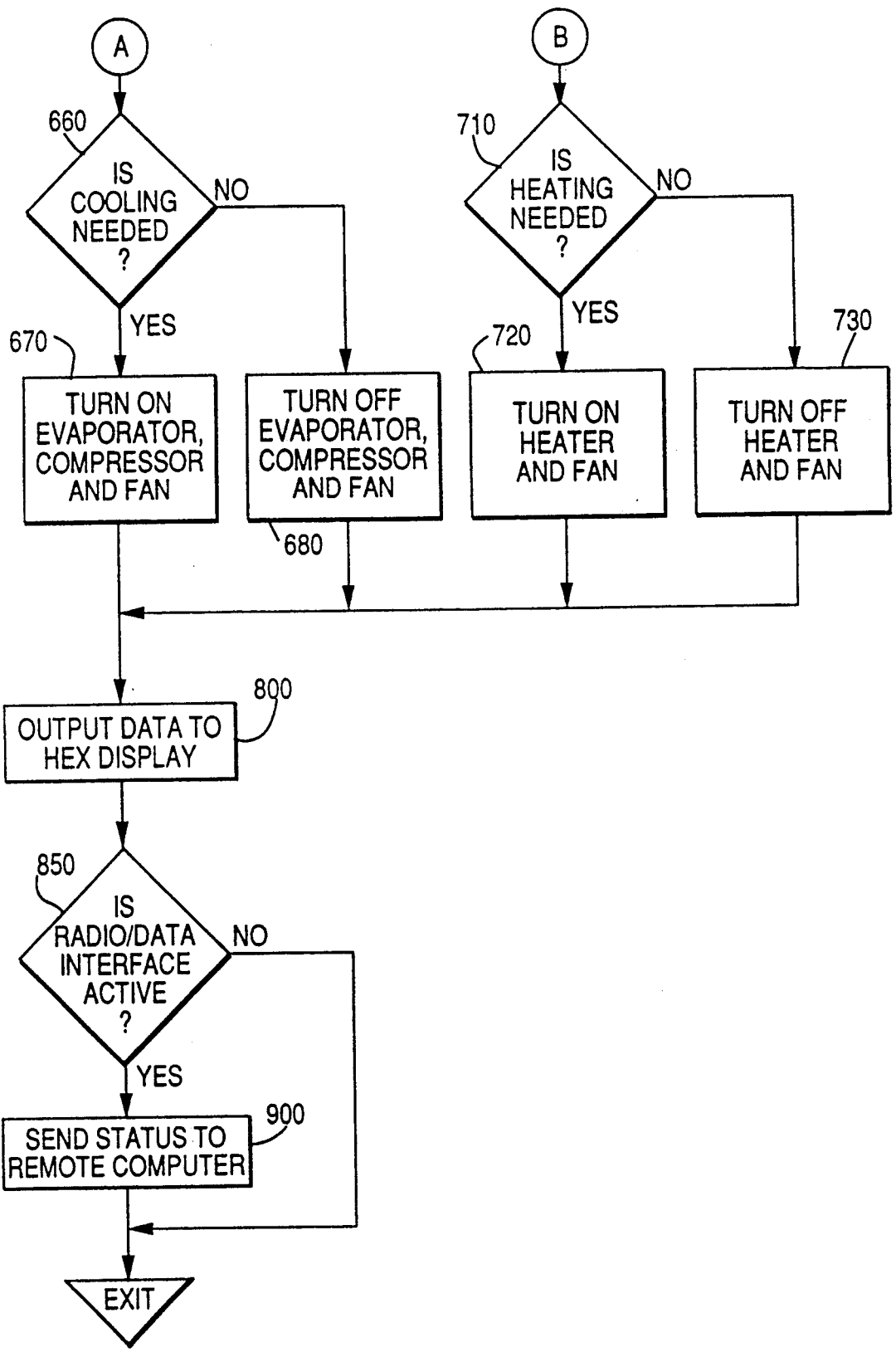

FIG. 4B further describes the control routine for determining the operating range of each individual operating means based on the control signal output by microprocessor 18. At steps 660 and 710, it is determined how much cooling or heating is needed to maintain the desired climate control level in the respective vehicles interior. If the sensed temperature is greater than the desired value, a cooling mode is activated at step 660 as the generated control signal indicates that the interior of the vehicle must be cooled to reach the desired value. If the sensed vehicle interior temperature is below the stored desired value, the control signal generated by the comparative unit automatically activates heating element control 26 which regulates heating elements 26a (step 710).

If cooling is needed, evaporator and compressor control 28 turns on evaporator 28a, and compressor 28b, and turns on fan(s) 30a in Step 670. If the evaporator and compressor control determines that cooling is no longer needed, it turns off evaporator 28a, compressor 28b, and slows down fan 30a in Step 680. If the heating element control 26 determines that heating is needed, it turns on heater element 26a and fan(s) 30a at step 720 and if heating is no longer necessary it turns off the heater in step 730. The amount of cooling or heating is determined by the first control signal, as well as the second control signal and is regulated by the appropriate operating control device. For example, if the difference between the current and the desired temperature is significant as it is at the beginning of service on an extremely cold or hot day, then the fans are operated at high speed while the heater or air conditioner elements are operated for maximum heating/cooling.

In addition, the measurement of the outside temperature determines if heating and cooling should be maximized. That is, if it is extremely cold or hot, the HVAC system according to the invention can take into account the periodic opening and closing of a vehicle's door which allows a blast of frigid air or a heat wave to enter the vehicle. The second control signal can carry this information.

The sensed interior temperature is continually output to the hex display so that an operator can view the actual temperature of the vehicle compartment (step 800). After an appropriate time interval, the HVAC control unit determines if the radio/data interface 22 is active (step 850). If it is, it sends the interior temperature status to central command computer 14 of the central command center 11 (step 800). This method allows the central command center to be aware of changes to the locally input climate controlled program.

In another embodiment of the present invention, the central command center 11 could comprise microprocessor 18, or the predetermined program of central command computer 14 could include the necessary comparing and generating steps; and the temperature sensing elements 16 and the operating devices of each HVAC unit 10 would be connected to radio/data interface 22. Thus, central command center 11 would receive the sensed existing temperature values from each mass transit vehicle transmitted through radio/data interface 22 via antenna 22a in order to compare the sensed values with the desired values stored in memory 15.

In this non-illustrated embodiment, the sensed existing values are received via antenna 24m and radio/data interface 24 of the central command center 11 After comparing the values, generated control signals are transmitted via antenna 24m to the respective HVAC operating control devices 20 of the respective mass transit vehicle. That is, these control signals identify the particular mass transit vehicle, as well as which HVAC element (e.g., heater, evaporator, compressor, etc.) is to be activated.

As will be apparent to one of ordinary skill, the central command center of the present invention can also remotely control the lighting, and air quality of each mass transit vehicle, as well as control the ambient atmosphere in the passenger compartment. This system could be further extended to operate an entire mass transit system, such as a train or rail system. For example, the single chip microprocessor can have a serial link; such as a modem which would allow outside communication with other external computers on the vehicle.

It will be understood that the above description of the present invention is susceptible to various modifications, changes and adaptations, and the same are intended to be comprehended within the meaning and range of equivalents of the appended claims.

What is claimed is:

1. A heating, ventilation, and air conditioni.ng system for a plurality of mass transit vehicles, each vehicle having at least one independently actuated heating, ventilation, and air conditioning unit, comprising:
   sensing means, disposed in each of the plurality of mass transit vehicles, for sensing existing temperature levels in a respective mass transit vehicle;
   control means, remote from said plurality of mass transit vehicles, for controlling the heating, ventilation and air conditioning unit of each of the plurality of mass transit vehicles, said control means including memory means for storing temperature values desired for each vehicle, and corresponding times of a day and days on which the stored temperature values are desired;
   means for selectively entering temperature values and corresponding times of a day and days when the temperature is desired into the memory means for each of the plurality of mass transit vehicles;
   comparator means, in communication with said sensing means and said control means, for comparing sensed existing temperature levels with stored temperature values for respective ones of the mass transit vehicles and generating a respective control signal for each respective mass transit vehicle, each said respective control signal being a function of a difference between the sensed temperature and the stored temperature value of a respective vehicle; and
   operating means, responsive to said control signals, for operating the heating, ventilating and air conditioning units of the respective vehicles for reducing the difference between the sensed existing temperature and the stored desired temperature of each respective vehicle.

2. A system according to claim 1, wherein said comparator means comprises individual comparator means for each of the plurality of mass transit vehicles.

3. A system according to claim 2, wherein said control means includes means for transmitting a command signal representing the stored temperature values, and each said individual comparator means comprises first receiving means for receiving a command signal from said remote control means indicating the desired temperature of the respective mass transit vehicle and the times of day at which the temperature is desired, storage means for storing the command signal, second receiving means for receiving the sensed existing temperature value of the respective vehicle and means coupled to the first and second receiving means for comparing the sensed and desired temperatures of the respective vehicle and generating the control signals.

4. A system according to claim 1, further comprising override means, disposed in each of the plurality of mass transit vehicles and being in communication with said control means, for overriding the desired stored temperature values for the vehicle in which the override means is disposed.

5. A heating, ventilation and air conditioning system according to claim 4, wherein the override means is a computer having a display and keypad for selectively entering temperature unit values for the respective vehicle.

6. A heating, ventilation, and air conditioning system, according to claim 5, further comprising communication means between each said computer and the remote control means wherein an operator of a mass transit vehicle can enter temperature unit values for his mass transit vehicle into the memory means.

7. A heating, ventilation, and air conditioning system according to claim 5, wherein said control means includes a radio transmitter and receiver; and each mass transit vehicle has a radio transmitter and receiver, said entered temperature unit values being transmitted by radio waves between said control means and the respective mass transit vehicles.

8. A heating, ventilation, and air conditioning system according to claim 1 wherein each heating, ventilation, and air conditioning unit comprises a heater, an air conditioner and at least one fan, further comprising means for sensing the outside temperature of the area in which each vehicle travels; and said comparator means further compares said outside temperature with the sensed existing temperature for each respective vehicle and generates a second control signal in dependance of the difference between the outside temperature and the sensed existing temperature, said second control signal generated by the comparing means actuating at least one of the heater, the air conditioner, and the at least one fan depending on the difference between the sensed existing temperature and the stored temperature value and the difference between the outside temperature and the sensed existing temperature.

9. A method for controlling the heating, ventilation and air conditioning units of a plurality of mass transit vehicles, comprising:
storing temperatures values desired for each of the plurality of mass transit vehicles at a central control station remote from said plurality of mass transit vehicles;
sensing the existing temperature within each of the plurality of mass transit vehicles;
comparing the sensed existing temperature of each of the plurality of vehicles with the corresponding stored temperature value desired for the respective vehicle;
generating a respective control signal for each of the plurality of vehicles, said control signals being a function of a difference between the sensed temperature and the remotely stored temperature value of each respective vehicle; and
automatically activating the respective heating, ventilation and air conditioning units of each vehicle in response to the generated control signals to effect reduction of the difference between the sensed and the remotely stored, desired temperatures for each vehicle.

10. The method acording to claim 9, further comprising the step of transmitting the corresponding stored temperature values to the respective vehicles.

11. The method according to claim 10, wherein said transmitting step includes transmitting the stored temperature values in the form of radio signals from the remote control station to each of the plurality of mass transit vehicles.

12. The method according to claim 9, further comprising the step of sensing the outside temperature of the atmosphere surrounding each vehicle, wherein said comparing step further includes comparing the sensed existing temperature within each vehicle with both the surrounding outside temperature and the stored temperature value of the respective vehicle.

13. The method according to claim 12 wherein each heating, ventilation and air conditioning unit comprises a heater, at least one fan an an air conditioner, further comprising entering a predetermined operating temperature range for each heating, ventilation aand air conditioning unit; and said comparing step determines the operating temperature range corresponding to the current outside temperature, and said generating step includes generating a second control signal in dependance of the determined operating temperature range for activating at least one of the heater, the at least one fan and the air conditioner.

14. The method according to claim 13, wherein the determination of said comparing step includes comparing the surrounding outside temperature with one of three temperatures ranges and selecting one of the three temperature ranges as the operating temperature range; and the generating step generates second control signals indicating a first temperature range which activates the heater, a second temperature range which activates the air conditioner and a third temperature range which activates the at least one fan, the third temperature range being a temperature range between the first and second temperature range.

* * * * *